United States Patent Office 2,770,488
Patented Nov. 13, 1956

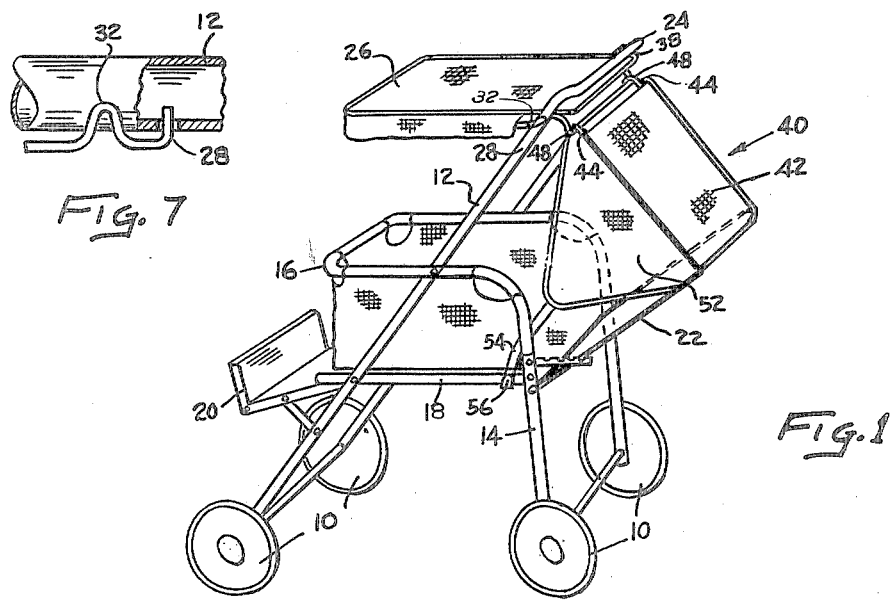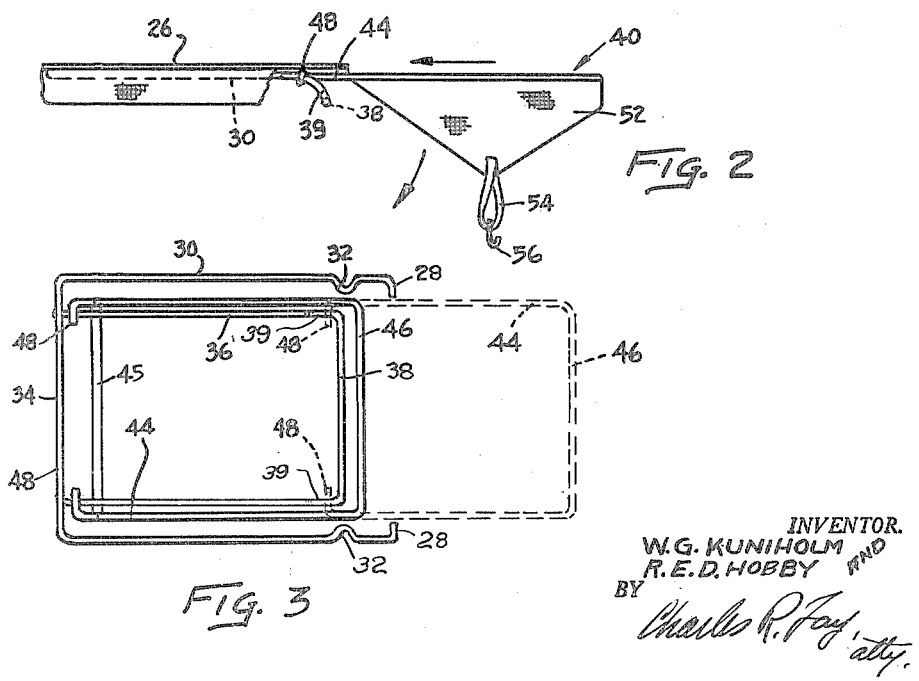

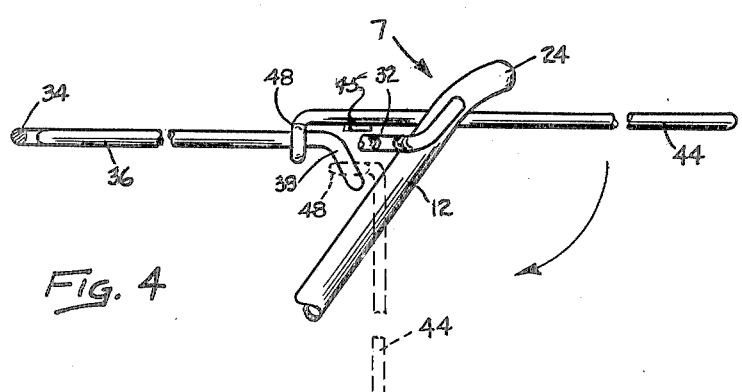
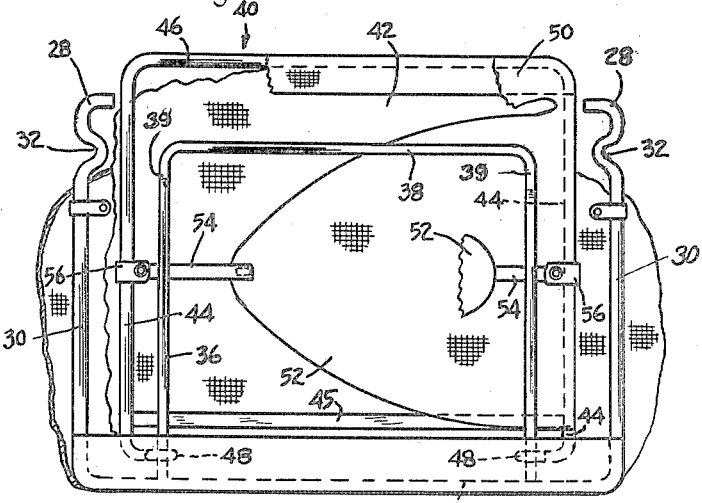
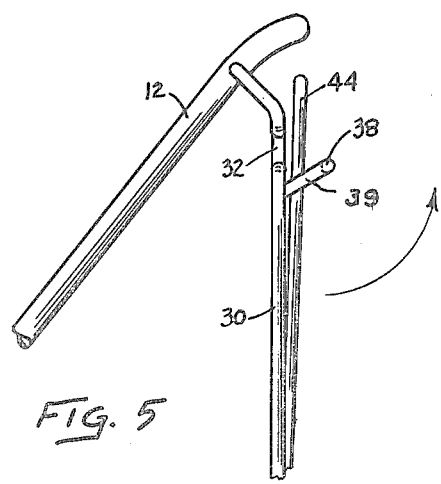

2,770,488

PROTECTIVE STRUCTURES FOR STROLLERS

Waino Gardner Kuniholm and Robert E. D. Hobby, Gardner, Mass., assignors to Kuniholm Mfg. Co., Gardner, Mass., a corporation of Massachusetts Application April 15, 1954, Serial No. 423,378

1 Claim. (Cl. 296—107)

This invention relates to a new and improved stroller top and more particularly to protective structures including a top or cover member which is made in a novel manner in association with a concealed sliding member adapted for selective disposition to the rear of the stroller under the pusher handle and providing a protective back, said protective back being provided with wings providing against side drafts, said wings being foldable with respect to the protective back and the latter, and wings, being slidably mounted under the cover or top member in concealed relation when the protective back is not desired to be located in operative condition, the folded or nested back and top members being swingable as a unit to drop down behind the occupant of the carriage when it is desired for the top or cover member to be out of the way to allow the occupant of the stroller to receive the benefits of sunshine, etc.

Further objects of the invention include the provision of a new and improved pivoted top or cover member for a stroller, the same being located in a horizontal condition on the pusher handle, or selectively it is swingable to depend vertically at the rear of the stroller, said top or cover member being provided with an interior concealed supplementary frame slidably guiding and supporting the separate protective back member, said supplementary frame being provided with means for slidably guiding said protective back member and providing for disposition thereof at the rear of the occupant of the carriage.

Other objects and advantages of the invention will appear hereinafter.

Reference is to be had to the accompanying drawings, in which

Fig. 1 is a perspective view illustrating the top or cover member in position with the rear protective member in operative position and including the wings therefor;

Fig. 2 is a side view illustrating the nesting action of the top or cover member and the rear protective member;

Fig. 3 is a diagrammatic view of the frame members illustrating the action thereof;

Figs. 4 and 5 are side views showing how the assembled frames are supported on and depend from the pusher handle;

Fig. 6 is a bottom plan view of the entire device showing the parts nested and on an enlarged scale; parts being broken away; and Fig. 7 is a detail showing the connection to the pusher handle.

The subject matter of the present invention may be applied to any stroller or similar device. As illustrated, in this case the stroller is provided with front and rear wheels 10, a rearwardly-inclined U-shaped frame member 12, and a rear frame member 14 assembled in association therewith and extending forwardly as at 16 providing an enclosure for the front and sides of a seat member 18. The seat member 18 may be provided with an adjustable footrest or well 20 and an adjustable backrest 22.

In Fig. 1, the footrest 20 is shown in its "up" position, and the backrest 22 is shown substantially in a downward position, whereby the occupant may rest substantially horizontally for sleeping. Many variations of these parts are well known and form no particular part of the present invention, but it is pointed out that the adjustment of parts 20 and 22 are ordinarily between substantially vertical positions for sitting up and substantially horizontal positions for lying down, there being as many intermediate positions as are thought to be necessary.

The frame 12 terminates at its closed upper end in a pusher handle 24, and this frame supports just below the pusher handle a top or cover member which is generally indicated at 26. This top or cover member comprises in general a light-weight open U-shaped frame covered with fabric or similar material, and the frame is provided with terminal portions directed inwardly toward each other as at 28, this frame being indicated at 30 and in the present case taking the form of a U-shaped wire having the in-turned portions 28 at the ends of the legs thereof. Slightly inwardly from these legs 28, there are in-turned portions 32 which provide stops resting on the frame 12 and holding the top cover 26 in horizontal position, with the in-turned legs 28 entered into the members of frame 12 as will be clear to those skilled in the art.

The top cover member 26 may be swung in a clockwise direction as seen in Figs. 1, 4 and 5 to clear the pusher member 24 and depend vertically as indicated in Fig. 5, wherein the same is shown with the cloth cover removed. This cloth cover and all cloth parts are also removed in Figs. 3 and 4 in order to more clearly illustrate the invention.

The U-shaped frame 30 is provided with a closed end at 34 and attached rigidly in spaced relation thereto, there is another but oppositely positioned U-shaped frame 36 lying within the confines of frame 30 and generally parallel thereto. The U-shaped frame 36 has a closed end 38, which is bent downwardly at an angle with respect thereto as best shown in Figs. 1, 2 and 4 at 39.

The auxiliary rear protective member generally indicated at 40 comprises a cloth member 42 mounted on a wire frame generally indicated at 44 and comprising another U-shaped frame having a closed end 46. The ends of the legs of the U-shaped frame 44 terminate in bent-in eyes 48 which are disposed around the legs of frame 36, and frame 36 slidably supports frame 44 by this means. A cross-bar 45 adjacent the ends of the frame 44 overlie frame 36 and maintain parallelism of the frames until bar 45 clears the member 38 in the rearward motion of the frame 44.

The frame 44 may be slid inwardly to its fullest extent as indicated in solid lines in Fig. 3, thus being concealed under the fabric of the top member 26; or it may be extracted to its fullest extent as shown in dotted lines in Fig. 3, the eyes 48 acting as stops abutting the closed part 38 of the U-shaped frame 36. If the frame 44 is extracted to its fullest extent, it will slide down the turned portions 39 and dangle in vertical position (see the dotted lines in Fig. 4). However, the frame 44 may be provided with a loose skirt or the like 50 in which the free end of the backrest member 22 may be disposed and partially supported (see Fig. 1). In this case, the rear protective member 40 will be at an angle to the vertical and will be supported in this position by the backrest 22 and will form a protective member for the stroller.

The cloth part 42 of the rear protective member 40 may also be provided with side wings as at 52 and these may be disposed over the side members of the frame 44. Elastic straps 54 may be secured to these wings, together with clips 56, the latter being clipped over the side members of frame 44 to fold the wings one over the other in flatwise condition up against the bottom surface of the protective member 40. Selectively, however, the wings may be extended (see Fig. 1), and the elastic straps and clips may be so disposed as to engage frame members of the stroller to hold the side wings 52 extended as shown in Fig. 1, providing against draft at the corners of the stroller.

The proportions and size of the wings may be varied to any extent desired, and ordinarily the backrest member 22 will be provided with fabric means for attachment to the frame member 14, so that the wings need only cover the area located above the backrest 22. However, of course the wings 52 may be shaped to cover the entire area between backrest 22 and rear protective member 40 if desired.

With the parts as shown in Fig. 1, the wings may be brought in and clipped over the side members of frame 44 as indicated in Fig. 6. The backrest 22 is then disengaged from the pocket 50, and the enlarged flat rear protective member 40 with the side wings folded may be slid forwardly along and under the top cover member 26 to be located wholly thereunder as indicated in Figs. 3 and 6. The rear protective member 40 and the wings are thus completely concealed and out of the way and merely make the top member 26 a little stronger and with an additional member located in conformance therewith.

The entire cover member and the assembled parts 40, etc. may be swung as stated above in a clockwise direction to hang downwardly as a unit as indicated in Fig. 5.

With the parts as shown in Fig. 6, that is, the rear protective member 40 nested in the top cover member 26, the fabric portion 42 of the member 40 and crosspiece 45 rest upon the frame 36 and this is what holds member 40 in its parallel underlying relationship with the top cover member 26.

It will be seen that this invention provides a very simple inexpensive nestable protective device for strollers and in effect substantially selectively changes the stroller into a baby-carriage. This construction may be applied to folding or rigid strollers or structures of like nature, and presents a greatly improved device for the occupants of strollers which commonly have no rearward protection as provided by the present invention.

Having thus described our invention and the advantages thereof, we do not wish to be limited to the details herein disclosed, otherwise than as set forth in the claim, but what we claim is:

A protective device for strollers and the like infants vehicles having seats comprising a covered frame for disposition on a pusher handle in overlying relation to the seat of the stroller, a slidable nestable covered frame mounted thereon, means to hold the frames in extended articulated relation, means to hold the frames selectively nested, the slidable frame depending freely when extended, below the pusher handle to the rear of the seat, and an inclined backrest for said stroller seat, the cover of the slidable frame being engageable with the backrest and the latter holding the slidable frame at an angle to the seat and backrest.

References Cited in the file of this patent

UNITED STATES PATENTS

| 219,784 | Van Dyck | Sept. 16, 1879 |
| 222,043 | Hazelip | Nov. 25, 1879 |
| 788,755 | Cretors | May 2, 1905 |
| 884,543 | Turner | Apr. 14, 1908 |
| 1,608,458 | Barbiers | Nov. 23, 1926 |
| 1,728,006 | Parry | Sept. 10, 1929 |
| 1,878,461 | Bradley | Sept. 20, 1932 |
| 1,988,380 | Goldberg | Jan. 15, 1935 |
| 2,001,224 | Tames | May 14, 1935 |
| 2,620,216 | Leonard | Feb. 23, 1954 |
| 2,714,524 | Swiggum | Aug. 2, 1955 |

FOREIGN PATENTS

| 455,613 | Great Britain | Apr. 23, 1936 |